Feb. 6, 1968  W. C. GARRETT  3,367,546
HAT BRIM TRIMMING MACHINE
Filed Nov. 22, 1965  2 Sheets-Sheet 1
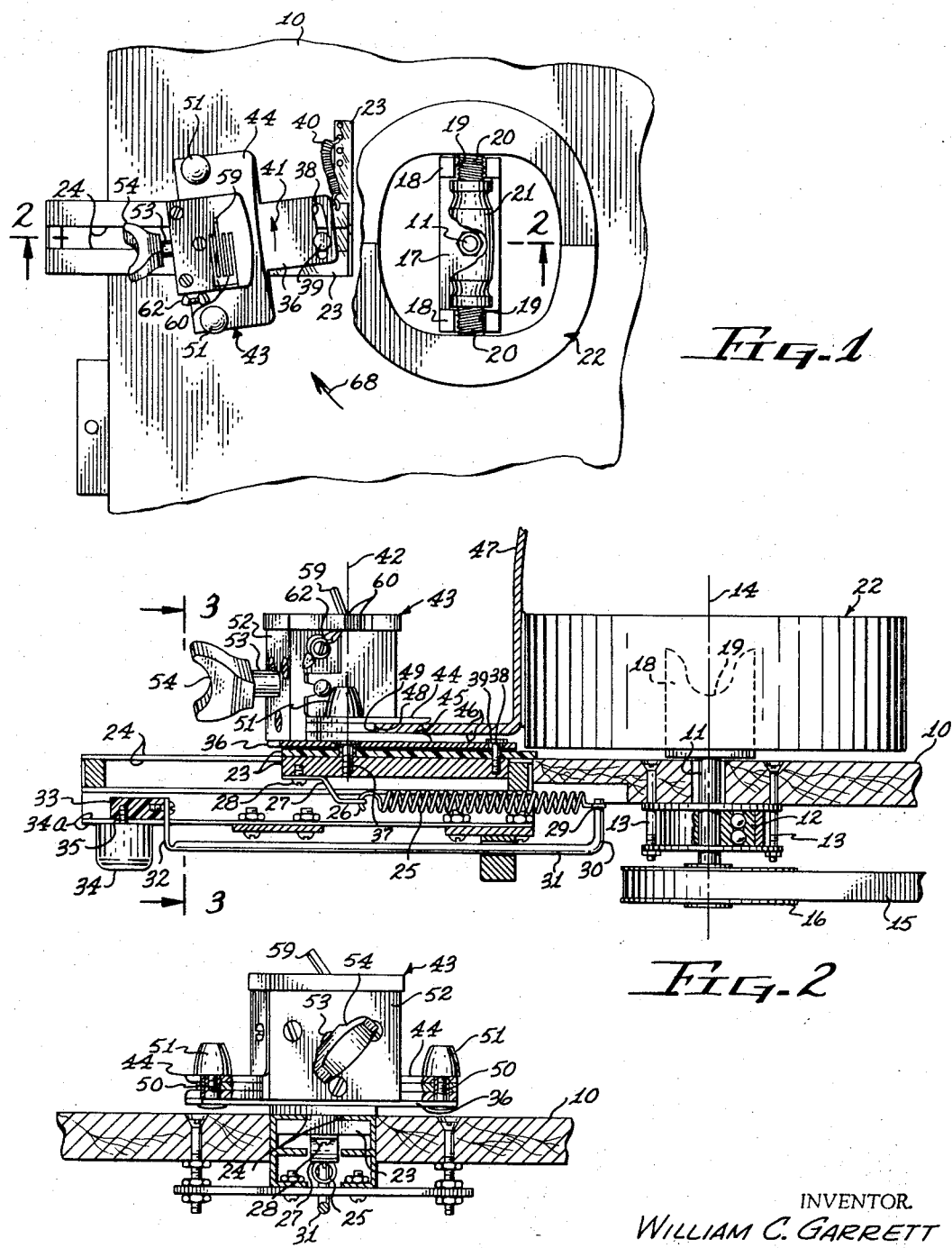
INVENTOR.
WILLIAM C. GARRETT
BY
Willard S. Groene
ATTORNEY Feb. 6, 1968 W. C. GARRETT 3,367,546
HAT BRIM TRIMMING MACHINE
Filed Nov. 22, 1965 2 Sheets-Sheet 2
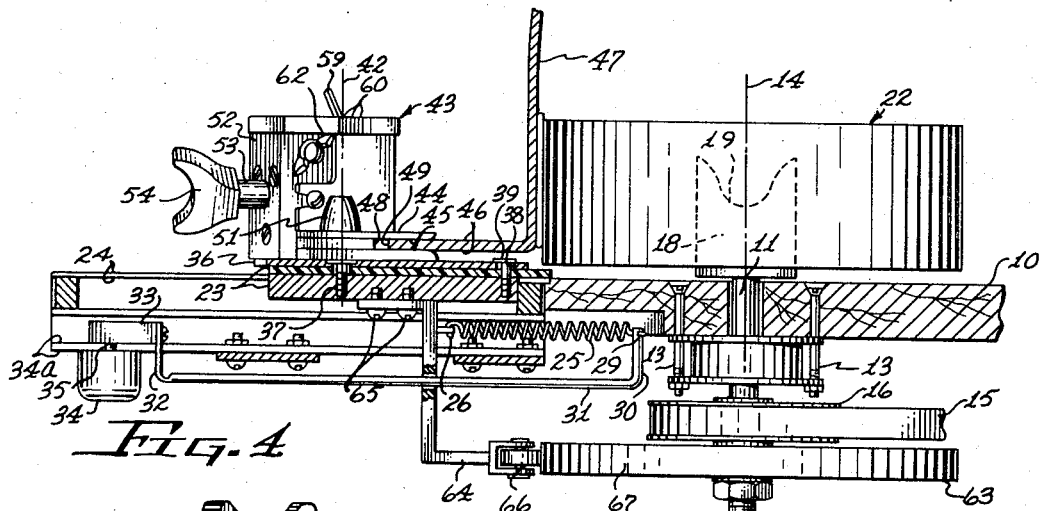
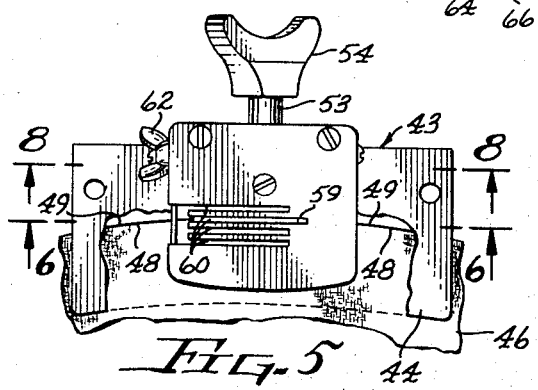
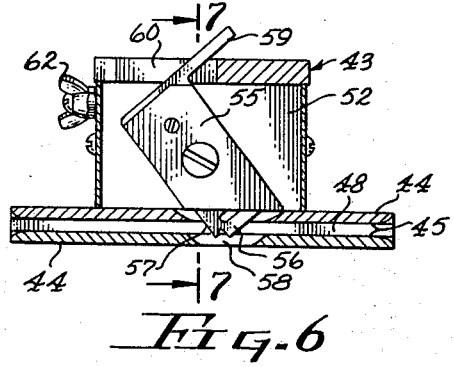
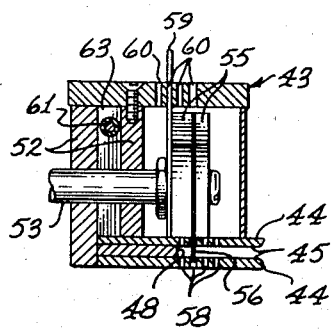
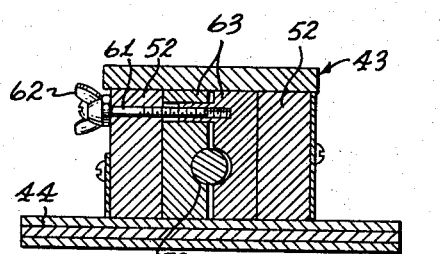
INVENTOR.
WILLIAM C. GARRETT
BY
Willard S. Gwend
ATTORNEY

United States Patent Office 3,367,546
Patented Feb. 6, 1968

3,367,546
HAT BRIM TRIMMING MACHINE
William C. Garrett, 5223 N. 28th Drive,
Phoenix, Ariz. 85017
Filed Nov. 22, 1965, Ser. No. 509,000
3 Claims. (Cl. 223—16)

One of the objects of this invention is to provide a hat brim trimming machine in which the hat is rotated while a cutting blade is controlled in radial movement relative to the hat by contact with the edge of the hat brim so as to remove a desired width of strip from the original hat brim.

Still another object of this invention is to provide a hat brim trimming machine having a tracer and template mechanism for guiding a cutting device to remove a predetermined amount from a hat brim and to provide a predetermined outer periphery for the brim during the trimming operation.

It is another object of this invention to support the hat for rotary movement on a conventional hat stretcher while automatically trimming a desired amount from the edge of the brim of the hat.

Further features and advantages of this invention will appear from a detailed description of the drawings in which:

FIG. 1 is a plan view of a hat brim trimming apparatus incorporating the features of this invention.

FIG. 2 is an enlarged sectional view on the line 2—2 of FIG. 1.

FIG. 3 is an enlarger sectional view on the line 3—3 of FIG. 2.

FIG. 4 is a sectional view showing a modification of the apparatus shown in FIG. 2 for controlling the contour of the cutting device.

FIG. 5 is an enlarged plan view of the adjustable cutter unit of the device.

FIG. 6 is a sectional view on the line 6—6 of FIG. 5.

FIG. 7 is a sectional view on the line 7—7 of FIG. 6.

FIG. 8 is a sectional view on the line 8—8 of FIG. 5.

As an example of one embodiment of this invention, there is shown a hat brim trimming machine comprising a frame or table 10 upon which is journaled the hat revolving spindle 11 by suitable bearings 12 mounted on the table by suitable bolts 13 so that the spindle may rotate about the vertical axis 14. A suitable drive motor, not shown, is connected to drive the belt 15 operating over the pulley 16 fixed to the spindle 11 to rotate the spindle at the desired speed for the trimming operation. The upper end of the spindle 11 is provided with a chuck member 17 having radially spaced work support jaws 18 having upwardly facing notches 19 arranged to receive the ends 20 of the turnbuckle 21 of a conventional hat stretcher 22.

A cutter carriage 23, FIG. 2, is arranged to reciprocate radially of the axis of rotation 14 of the spindle 11 on suitable guideways 24 on the table 10. A tension spring 25 has one end 26 connected to a bracket 27 fixed to the outer end of the carriage 23 by a suitable screw 28. The other end 29 of the spring 25 is connected to the turned over end 30 of the tensioning rod 31 which is fixed at its rear end 32 to an adjustable clamp block 33 sliding on the guide track 34a of the table 10. An actuating and clamping knob 34 has a clamp screw 35 fixed therein and threaded in the clamp block 33 for moving and clamping along the guide track 34a for adjusting the desired tension of the spring 25.

A top plate 36 is pivotally mounted on a pivot stud 37 fixed in the cutter carriage 23, the inner end of the top plate being provided with an elongated arcuate slot 38 through which projects the enlarged head bolt 39 suitably fixed in the cutter carriage 23 to guide and limit the pivoting movement of the top plate 36. A biasing tension spring 40 is connected between the inner swinging end of the top plate 36 and the cutter carriage 23 to normally yieldingly swing the top plate 36 in the direction of the arrow 41 about the axis of swinging 42 of the pivot stud 37.

Demountably fixed to the top of the plate 36 is the cutter support unit 43 having a hat rim engaging base plate 44 having a hat brim receiving slot 45 arranged to engage the top and bottom of the hat brim 46 of a hat 47 while the root 48 of the slot 45 is arranged to engage the edge 49 of the hat brim. The base plate 44 is demountably secured to the top plate 36 by suitable screws 50 and finger nuts 51.

Fixed to the brim engaging base plate 44 is the upstanding support piece 52 in which is journaled the cutter support rockshaft 53 having a manipulating knob 54 fixed to its outer end. Fixed to the inner end of the rockshaft 53 is the cutter bit holder block 55 arranged to support a suitable cutter bit 56 such as a safety razor blade having a cutting edge 57 arranged to be swung through a series of slots 58 formed in the base plate 44 to present the cutting edge in operative position across the slot 45 to operate upon the hat brim. An indexing and positioning indicator finger 59 is fixed to the cutter bit holder block 55 and is adapted to be swung into locating slots 60 to control and indicate the amount of material to be removed from the hat brim edge 49. A suitable clamp screw 61 having a wing nut 62, FIG. 8, may be provided to secure the clamp blocks 63 against the rockshaft 53 to lock the cutter 56 with its cutting edge 57 in operative position.

In the arrangement shown particularly in FIGS. 1 and 2 the edge 49 of the hat brim engaging the root surface 48 of the slot 45 determines the radially inward position of the carriage 23 and the pivotal position of the top plate 36 about the axis 42 and thereby the contour cut on the edge of the hat brim. The pivoting movement of the top plate causes the cutting edge 57 to operate in a tangential direction at all times relative to the edge being cut on the brim of the hat as it is rotated on the hat stretcher by the spindle 11 as indicated by the direction arrow 68. Thus, the contour of the finished edge cut on the hat brim is determined by the original edge of the hat before cutting.

In certain instances it may be desirable to put a different contour on the cut or trimmed edge of the hat from the original brim edge where the brim edge to be trimmed is damaged or rough and unsuitable for a guide for the contour cut. In these instances it may be desirable to use the arrangement shown in FIG. 4 where a contour cam 63 is fixed to the spindle 11 and a tracer finger 64 is fixed to the cutter carriage by suitable screws 65, the tracer having a cam roller 66 riding on the periphery 67 of the cam 63 which periphery preferably takes the form of the desired shape of the finished hat brim edge. In this arrangement the edge of the hat brim does not contact the root surface 48 of the hat brim slot 45.

While the apparatus herein disclosed and described constitutes a preferred form of the invention, it is also to be understood that the apparatus is capable of mechanical alteration without departing from the spirit of the invention and that such mechanical ararngement and commercial adaptation as fall within the scope of the appendent claims are intended to be included herein.

What is claimed is:
1. A hat brim trimming machine comprising in combination:
   (A) a frame,
   (B) a hat gripping and rotating spindle journaled on said frame,
   (C) a carriage slidable on said frame radially of said spindle,
   (D) means interconnected between said frame and said carriage arranged to yieldingly urge said carriage toward said spindle, (E) a top plate pivotally mounted on said carriage arranged to swing on an axis parallel to and radially spaced from the axis of rotation of said spindle, (F) means connected between said frame and said top plate to yieldingly urge said plate in a direction of rotation the same as said spindle, (G) and a cutter mounted on said top plate having a cutting edge operatively positioned in a direction opposing the direction of rotation of said work spindle and adapted to be tangent to the edg of a hat brim of a hat mounted on said spindle.

2. A hat brim trimming machine as set forth in claim 1 in which a hat brim edge engaging surface is provided on said top plate adapted to engage the edge of a hat mounted on said spindle to control the relative radial position of said spindle axis and said axis of swinging of said top plate during the rotation of said hat by said spindle.

3. A hat brim trimming machine as set forth in claim 1 in which a control cam on said spindle engages a tracer finger on said carriage to control the relative radial position of said spindle and top plate pivotal axis during the rotation of said spindle.

References Cited
UNITED STATES PATENTS

| | | | |
|---|---|---|---|
| 308,191 | 11/1884 | Nutt | 223—16 |
| 1,570,373 | 1/1926 | Craw | 223—16 |

JORDAN FRANKLIN, *Primary Examiner.*

GEORGE V. LARKIN, *Examiner.*